(12) United States Patent
Amend

(10) Patent No.: US 11,849,314 B2
(45) Date of Patent: Dec. 19, 2023

(54) SELECTABLE TUNNEL ENCRYPTION LEVEL MANAGEMENT FOR MULTI ACCESS USER EQUIPMENT

(71) Applicant: Deutsche Telekom AG, Bonn (DE)

(72) Inventor: Markus Amend, Nidda (DE)

(73) Assignee: DEUTSCHE TELEKOM AG, Bonn (DE)

( * ) Notice: Subject to any disclaimer, the term of this patent is extended or adjusted under 35 U.S.C. 154(b) by 232 days.

(21) Appl. No.: 17/340,125

(22) Filed: Jun. 7, 2021

(65) Prior Publication Data

US 2021/0385648 A1    Dec. 9, 2021

(30) Foreign Application Priority Data

Jun. 9, 2020    (EP) .................................... 20179081

(51) Int. Cl.
| | |
|---|---|
| *H04M 1/66* | (2006.01) |
| *H04W 12/037* | (2021.01) |
| *H04L 45/24* | (2022.01) |
| *H04W 72/12* | (2023.01) |
| *H04W 84/12* | (2009.01) |

(52) U.S. Cl.
CPC ........... *H04W 12/037* (2021.01); *H04L 45/24* (2013.01); *H04W 72/12* (2013.01); *H04W 84/12* (2013.01)

(58) Field of Classification Search
CPC .... H04L 45/24; H04W 12/037; H04W 72/12; H04W 72/20; H04W 12/08; H04W 12/03
See application file for complete search history.

(56) References Cited

U.S. PATENT DOCUMENTS

| | | | | |
|---|---|---|---|---|
| 2012/0079559 | A1* | 3/2012 | Reznik | H04W 12/086 726/1 |
| 2018/0255560 | A1* | 9/2018 | Han | H04W 72/1215 |
| 2018/0337889 | A1 | 11/2018 | Panchapakesan et al. | |
| 2019/0124708 | A1* | 4/2019 | Shi | H04W 76/15 |
| 2019/0327269 | A1 | 10/2019 | Lee et al. | |
| 2020/0007449 | A1* | 1/2020 | Morin | H04L 69/22 |
| 2020/0120070 | A1* | 4/2020 | Thubert | H04L 67/60 |
| 2020/0267541 | A1* | 8/2020 | Huang | H04W 12/10 |
| 2020/0344769 | A1* | 10/2020 | Salkintzis | H04W 28/26 |

FOREIGN PATENT DOCUMENTS

| | | | |
|---|---|---|---|
| WO | WO 2017172450 | A1 | 10/2017 |
| WO | WO 2018013139 | A1 | 1/2018 |

* cited by examiner

*Primary Examiner* — Shantell L Heiber
(74) *Attorney, Agent, or Firm* — LEYDIG, VOIT & MAYER, LTD.

(57) ABSTRACT

A method for ensuring secure wireless communication of a first device in a communication system includes: retrieving information about a type of trustiness of a first communication link of a first access technology and about a type of trustiness of a second communication link of a second access technology, wherein a second device and the first device are configured to communicate data with each other via the first communication link and the second communication link; determining, by a processor of the first device and/or a processor of the second device, security levels based on the information about the type of trustiness of the first communication link and about the type of trustiness of the second communication link.

19 Claims, 5 Drawing Sheets

SELECTABLE TUNNEL ENCRYPTION LEVEL MANAGEMENT FOR MULTI ACCESS USER EQUIPMENT

CROSS-REFERENCE TO PRIOR APPLICATIONS

Priority is claimed to European Patent Application No. EP 20 179 081.3, filed on Jun. 9, 2020, the entire disclosure of which is hereby incorporated by reference herein.

FIELD

This disclosure generally relates to security aspects of user equipment, in particular of user equipment in multipath access scenarios, that communicates over multiple communication links, in particular wireless communication links, with a network.

BACKGROUND

Traffic managed user equipment (UE) typically connects to a remote endpoint via a tunnel as for example by Virtual Private Network (VPN) technology. The remote endpoint can be a server of a provider that is located in the network. The remote endpoint is responsible to request and/or deliver the service on behalf of the user equipment as depicted in FIG. 1 for illustration purposes.

Such communication scenarios are common for securing, shaping and monitoring data traffic, protecting the UE and its associated services, and managing the data traffic. Managing the data traffic becomes more sophisticated in multi-connectivity environments, in particular when the user equipment is connected in a hybrid communication scenario with more than one communication access or communication link at a time. For example, the user equipment can be connected via a cellular and Wi-Fi communication link to the network.

Encryption (and especially encryption of data traffic transmitted via tunnels) has become a key requirement in a compute cloud environment, wherein all the communications between assets are required to be encrypted. An example is IPSec tunneling to connect system components. Often, setting up an encrypted tunnel between different network entities, virtual machines (VMs) or similar entities is to ensure that communications between hosts are sufficiently secure so that confidential information (e.g., associated with a particular tenant) will not be leaked. A known straightforward implementation that addresses the latter requirement is to simply setup an encrypted tunnel with a maximum security level between the network entities, and then use this tunnel for all of the communications. While this approach is commonly used, it can lead to resource over-utilization, especially in the case where applications/protocols running on the network entities, in particular running on the UE and/or the server, already provide encrypted data. In particular, and because the underlying data itself is already encrypted, setting up and maintaining a further encrypted channel (namely, the IPSec tunnel through which the originally-encrypted data can then travel) leads to a waste of computational and memory resources.

To address this "waste" of computational and memory resources, US 2019/327269 A1 describes a method of context-based adaptive encryption between entities that transfer their data within the network over a communication link of a single access technology. A data packet that is to be transmitted via the single communication link is being analyzed with respect to its content and it is determined if the information in the data packet can be transported between the entities according to certain security policies. Depending on the security demand, the data packet can be transmitted via an encryption layer over a first channel or via an unencrypted layer over a second channel, wherein that second channel saves computational and memory resources.

An almost standardized multi-connectivity architecture, which makes use of the above described VPN technology is 3GPP ATSSS as described in "3GPP Technical Specification: 23.501, Version 16.3.0, 22. December 2019". ATSSS manages simultaneous connectivity for UEs in hybrid communication scenarios like over cellular (3GPP access) and non-cellular access (e.g. Wi-Fi). FIG. 2 shows schematically such an ATSSS process, respectively the network protocol stack for passing through the Wi-Fi in FIG. 3, highlighting the IPsec tunnel in use. In addition to an ATSSS approach, FIG. 4 describes a principal architecture of an UE that manages the traffic on the basis of a OTT multi-connectivity provider. The approach of FIG. 4 differs from ATSSS in respect that the access network operator can leverage tunnel methods for each individual access.

In the above described scenarios, tunnels that are used for single path or multipath are usually encrypted for several reasons, e.g. protecting traffic when passing potential untrusted networks.

In a broader context also SOCKS can be seen as a tunnel from a technical viewpoint, which is widely used in Multipath-TCP, MPTCP, environments as described in www.t-essares.net/mtcp-deployment-options/. These methods can be encrypted by additional components, for example encryption layers, since SOCKS does not provide encryption by itself.

SUMMARY

In an exemplary embodiment, the present invention provides a method for ensuring secure wireless communication of a first device in a communication system. The method comprises: retrieving information about a type of trustiness of a first communication link of a first access technology and about a type of trustiness of a second communication link of a second access technology, wherein a second device and the first device are configured to communicate data with each other via the first communication link and the second communication link; determining, by a processor of the first device and/or a processor of the second device, security levels based on the information about the type of trustiness of the first communication link and about the type of trustiness of the second communication link, wherein determining the security levels comprises: setting up a uniform security level for the first communication link and the second communication link based on the information about the type of trustiness of the first communication link and about the type of trustiness of the second communication link; or setting up a first security level for the first communication link and a second security level for the second communication link based on the information about the type of trustiness of the first communication link and about the type of trustiness of the second communication link.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
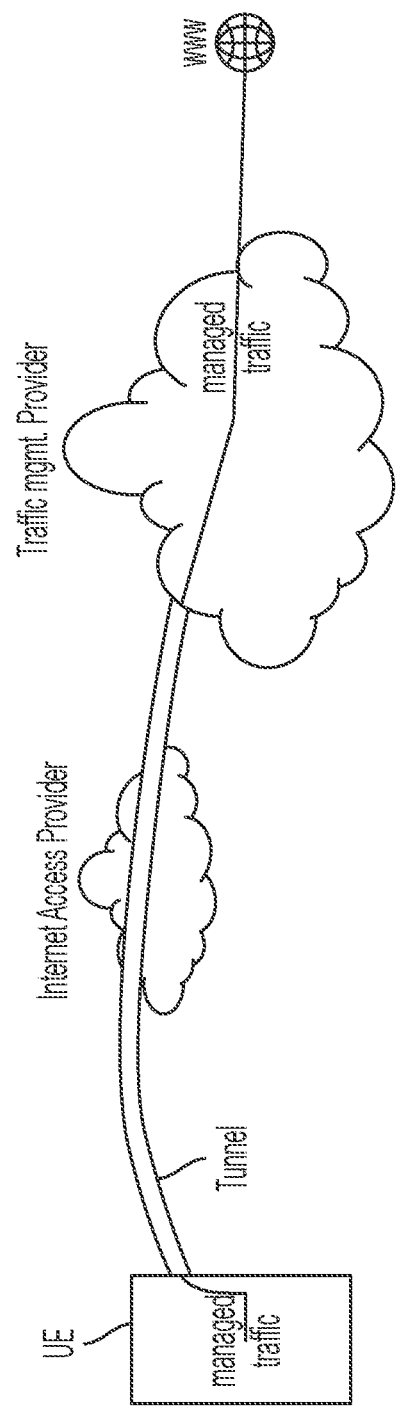
FIG. 1 shows a user equipment with traffic management to communicate with a network.
Figure 2:
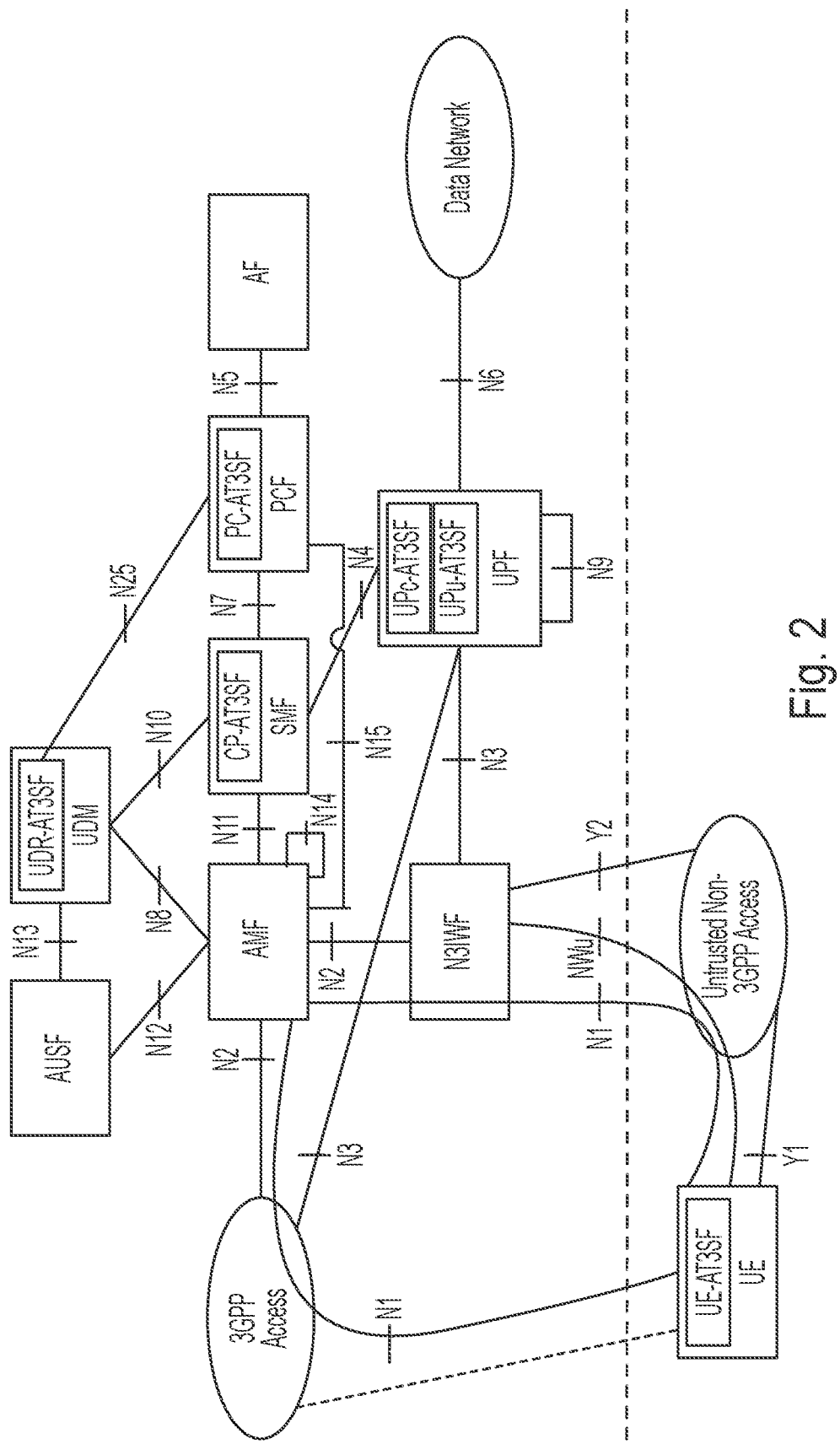
FIG. 2 shows a 3GPP ATSSS architecture integrating multi connectivity into an access provider network.
Figure 3:
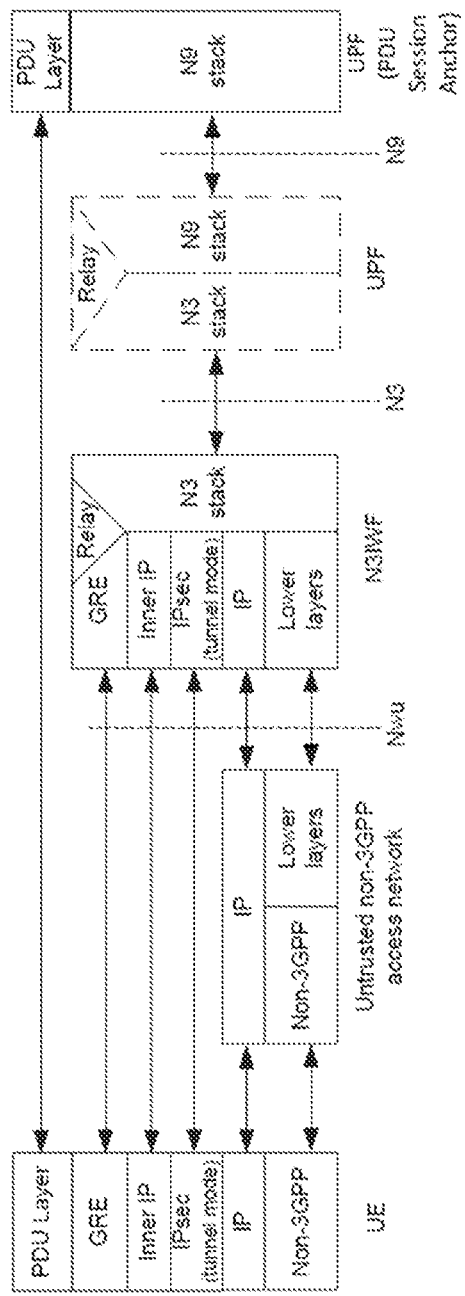
FIG. 3 shows an ATSSS protocol stack for untrusted 3GPP access (Wi Fi) with IPsec tunneling.

Exemplary embodiments of the invention provide methods and techniques to further reduce computational and memory resources associated with the encrypted data transfer in networks, especially in hybrid wireless networks.

The features of the various aspects of the invention described below or the various examples of implementation may be combined with each other, unless this is explicitly excluded or is technically impossible.

According to a first aspect of the invention, the invention provides a method for ensuring secure communication, in particular wireless communication, of a user equipment (UE) in a communication system, wherein the communication system comprises a user equipment and a server, in particular a server of a network provider, configured to communicate data of a data traffic with each other over a network via a first communication link of a first access technology and a second communication link of a second access technology, possible access technologies of the so-called hybrid communication network can be: Ethernet (802.3), Wi-Fi (802.11 a/b/g), 3G, LTE, and/or 5G standards; the method comprises the steps of:

Retrieving information about a type of trustiness of the first communication link of the first access technology and about a type of trustiness of the second communication link of the second access technology;

It is possible, that the first and/or the second communication link are already established or that they shall be established for the purpose of communication; information about the type of trustiness of the communication links can be a trusted security certificate or a trusted authentication method that can be stored in the memory of the server, the UE or any other trusted network authority. The type of trustiness can specify a certain level of trustiness that is assigned to the individual communication links. For example, there could be a high, medium and low level of trustiness of a Wi-Fi hotspot. Is to be understood, that a high trustiness level is the best regarding the security of the communication independent from any piggybacked data;

Providing the information about the type of trustiness as a first input parameter to an algorithm implemented on a computing unit of the UE and/or the server, wherein the algorithm is configured to calculate security levels;

at least one of the UE or the server need to know the type of trustiness. If the type of trustiness was retrieved by the server because this information was stored in its memory, then the server already knows the type of trustiness. It is also possible that the server transmits this information to the UE by establishing a cellular communication link or by using a control plane via a Wi-Fi hotspot. In a similar technical way, the server can be provided with this information, if this information is stored in the other trusted network authority. "Passpoint" or "Hotspot 2.0" can be used to manage information about the type of trustiness. The security levels calculated or rather determined by the algorithm can be of various types: A high security level is provided by an encrypted tunneled communication link, whereas the tunnel technology and the encryption technology both enhance security in different ways. As a downside, the combination of both technologies results in the highest consumption of resources. A medium security level is provided by a tunneled communication link (without encryption) or by an encrypted communication link (without tunneling). It depends on the specific technical implementation, which one has the higher security level. The encryption technique can comprise encrypting TCP-data packets, using the QUIC-protocol or TCP with TLS (Transport Layer security). In the latter case, the parameters of the TLS define the security level. These medium security levels result in medium energy consumption. A low security level is provided without tunneling or encryption. The low security levels result in low energy consumption. In principle, the subdivision of the security levels can be as fine as desired, especially more than three security levels. Tunneling and encryption can be applied by sending the data traffic through a security layer of the UE and/or the server.

wherein as a first option: setting up a uniform security level of the first communication link and the second communication link based on the information about the type of trustiness;

as stated above, the security levels can be a tunneled encrypted security level, a tunneled security level, an encrypted security level or a security level without tunneling and encryption. Both the UE and the server can establish a respective communication link e.g. by using handshake methods. Hence, they both know about the type of trustiness and can in principle each decide on an appropriate security level to ensure a secure communication channel. This security level is a dynamic security level and can be adjusted during the course of communication. For example, there could be a high, medium and low security level of the encryption of the tunnels. The setting of the appropriate security level can be performed by an algorithm that is implemented on a computing unit on the UE or the server. Preferably, the algorithm sets the high security level if the level of trustiness is low, the algorithm sets the medium security level if the level of trustiness is medium, and the algorithm sets the low security level if the level of trustiness is high;

This provides the advantage that the security level is based on the level of trustiness which yields in an appropriate and dynamic security level. As a rule of thumb it can be said that the higher the security level is, the more computational resources of the UE needs to be used which shortens the battery's lifetime of the UE and/or the data throughput. However, the battery lifetime is often a critical issue of user equipment like UE. Due to the appropriate and dynamic security level, the UE sets the level of security for the user plane not higher than necessary to ensure secure communication. Hence, the battery lifetime of the UE is significantly longer and the maximum data throughput is higher;

or as a second option: setting up a first security level of the first communication link and a second security level of the second communication link based on the information about the type of trustiness;

as stated above, the security levels can be a tunneled encrypted security level, a tunneled security level, an encrypted security level or a security level without tunneling and encryption. Of course, the invention is not limited to two different communication links but is to be understood that it also works with multiple different communication links that can have different communication standards. Like described above, these security level are a dynamic security levels and can be adjusted during the course of communication;

This provides also the advantage that are described above. But in addition it facilitates an even stronger saving of computational and energy resources since it enables an even finer granularity with respect to the security levels. This takes the fact into account that not all data packets need to be transmitted with the same level of security or that one communication link is more secure than another so that there is no need to apply a uniformly high security level of encryption to both this communication. For example, a home-based Wi-Fi communication of the first communication link could be considered safer than a foreign Wi-Fi of second communication link. Therefore, the first security level can be set lower than the second security level. For example, the first security level results in an encrypted communication link and the second security level results in an encrypted tunneled communication link. Both communication links can be used, for example, to enhance data bandwidth, but it saves computational resources if not both security levels are set to the high encrypted tunneled security level of the second communication link.

The above mentioned OTT technique generally uses tunneling. In that case, tunneling will be accepted and the security level is being adjusted only with respect to the encryption level, which can in principle be subdivided in multiple sub-levels. In a similar way, ATSSS generally uses one of its communication links as a tunnel.

In an embodiment, the algorithm analyzes the data for transmission and determines a security demand level of the data. The analyzed data can be the data that is used by an application running on the UE and/or the server. Typically, the data is transmitted in pieces of data, the so-called data packets, wherein it is possible to analyze each data packet because each of these data packet can require a different security demand level due to different content.

This provides the advantage, that the algorithm gains knowledge about how critical certain data packets are and if there are differences concerning the required security demand level between the individual data packets. For example, it is possible to define three different security demand levels: high, medium and low. Of course, the invention is not limited to three different security demand levels so that it is in principle possible to define any number of security demand levels. If the analysis yields that all data packets have for example a low security demand level, it might even be possible that no additional tunnel encryption is required at all.

In an embodiment, the data is analyzed with respect to deep packet inspection (DPI), protocol information and/or destination of data packets. The algorithm, in particular a packet parser unit, analyzes one or more attributes, e.g., protocol type, application type, current encryption strength, content payload, etc., associated with a data packet transmission to determine to which level tunnel encryption is even required. The evaluation can include a deep packet inspection (DPI), especially when the information at the network layer (e.g., IP address, port number, etc.) is not sufficient to determine if the payload in the packet needs to be further encrypted. Based on the result of the analysis, data packets are dispatched to an encryption process that can be implemented in the algorithm.

A simple example is when the payload contains a credit card number. Packet content analysis typically leverage the Deep Packet Inspection (DPI) capabilities that are available in the device in which the functionality is implemented. DPI may also be utilized when the information at the network layer (e.g., IP address, port number, etc.) is not sufficient to determine if the payload in the packet needs encryption. Thus, preferably the payload content analysis uses DPI during the packet parsing. The payload content analysis using DPI inspection may identify other user attributes, such as user identity, that are then evaluated for compliance with a particular security policy. Of course, these are merely representative examples.

In an embodiment different data packets of the data require different security demand levels.

This provides the advantage, that the security level can be set to level that satisfies of all data packets. This also provides an option to decide if certain data packets shall not be transmitted at all due to their security demand is not being fulfilled.

Preferably, the security demand level of the data packets serves as a second input parameter to the algorithm for the calculation of the encryption security levels.

This provides the advantage, that the security levels can be adjusted as to meet the requirements of the individual security demands of each data packet.

In an embodiment, a multipath scheduler schedules data packets of the data traffic to the first communication link or the second communication link. The multipath scheduler that can be implemented in server or in the UE is a functional unit that distributes data packets to different communication links by applying certain rules. The policy of the rules can be, that the multipath scheduler can distribute the data to reach maximal data throughput on the communication network. In principle, this policy can consider security issues.

The multipath scheduler can receive the information about the type of trustiness and/or the security demand level of the data. By receiving the information about the type of trustiness and/or the security demand level of the data, this information can serve as input to the rules which are applied by the multipath scheduler.

Preferentially the multipath scheduler schedules the data packets of the data traffic to the first communication link or the second communication link based on the respective security demand level of the data packets and/or the type of trustiness of the data. Each data packet can be signed to one of the communication links and each of those data packets can be encrypted with its individual security level.

This provides the advantage of a maximal flexibility in and distributing the data packets to the first communication link or to the second communication link in order to find the optimal trade-off between security and saving of computational resources. For example, very critical data—with a high security demand level—can be distributed to the communication link that has a high level of trustiness and can be tunneled and/or encrypted with a high encryption security level; and very uncritical data—with low security demand level—can be distributed to the communication link that has a low level of trustiness and can be encrypted with a low encryption security level.

In an embodiment, information about the type of trustiness is stored in a network entity, gained from user feedback, gained from Wi-Fi specifications and/or gained from location information. The network entity can be a UE or a server.

This provides the advantage, that the server can also serve as a trusted authority or that information about the type of trustiness can be assessed in different ways. For example, if there is no information about the type of trustiness start in a trusted authority, it is possible that the user defines such a type of trustiness. This could be the case, if the user checks in into the hotel and he has full trust in the local Wi-Fi of the hotel from the Wi-Fi specifications the name type of security (WPAx, . . . ) can be assessed. It is also possible to determine which Wi-Fi hotspot is available at a distinct location by using GPS, cell-id, Wi-Fi triangulation and/or SSIDs.

Advantageously, a control plane is established on the communication link to transmit the information about the type of trustiness from the server to the UE.

In contrast to the user plane, the control plane is to be understood as a communication link in which no critical data concerning the user is being transmitted. It follows, that it is no big security issue if data of this control plane is transmitted without high security measures. If the UE is to set the security level for the user plane, it needs to know about the information about the type of trustiness. If the server uses the control plane to transfer those data this has the benefit, that no critical user data is transferred along with the information about the type of trustiness. The UE then has the necessary data to decide on an appropriate security level of the user plane.

In an embodiment, the information about the type of trustiness is transmitted via a cellular network from the server to the UE.

This provides the advantage, that the information about the type of trustiness is transmitted via an alternative channel independent from foreign Wi-Fi hotspots or the like, so that the information about the type of trustiness cannot be manipulated while it passes through the foreign Wi-Fi hotspot.

As a second aspect, the invention provides a communication system for ensuring secure wireless communication of a user equipment, UE, wherein the communication system is configured to perform the steps according to a method of claims described above, wherein the communication system comprises
  a user equipment,
  a server, in particular a server of a network provider,
  a network configured to provide a first communication link of a first access technology and/or a second communication link of a second access technology for the communication of data traffic between the UE and the server;
wherein a computing unit that is implemented on at least one of the user equipment or the server is configured to retrieve information about a type of trustiness of communication links, wherein the information about the type of trustiness serves as a first input parameter to an algorithm implemented on the computing, wherein
the algorithm is configured to calculate security levels, wherein
as a first option: the algorithm is configured to set up a uniform security level of the first and the second communication link based on the information about the type of trustiness or that
as a second option: the algorithm is configured to set up a first security level of the first tunneled communication link and a second security level of the second tunneled communication link based on the information about the type of trustiness.

This provides advantages analogous to those described above.

In an embodiment, the user equipment and/or the server comprise a multipath scheduler configured to distribute the data traffic between the first and the second communication link.

This provides the advantage that each of the devices can efficiently distribute the data traffic or that the efficiency is even improved if both devices distribute data traffic.

According to a third aspect, the invention relates to a method for ensuring secure communication of a network entity, in particular a user equipment or a server of a network provider, with another network entity over a network, wherein the method comprises the steps of:
retrieving information about a type of trustiness of a first communication link of the first access technology and about a type of trustiness of a second communication link of the second access technology by the network entity;
providing the information about the type of trustiness as a first input parameter to an algorithm of the network entity, wherein the algorithm is configured to calculate encryption security levels,
characterized by
as a first option: setting up a uniform security level of the first communication link and the second communication link based on the information about the type of trustiness, or
as a second option: setting up a first security level of the first communication link and a second security level of the second communication link based on the information about the type of trustiness.

This provides the advantage that a generic network entity, in particular the user equipment or the server, can perform steps to yield the advantages discussed above. It follows that a user could decide to buy a user equipment, for example a smartphone, that is configured to perform the steps described above so that he gets an optimal trade-off between security and battery lifetime when using his smart phone.

According to a fourth aspect, the invention relates to a network entity (in particular a user equipment or a server of a network provider) for ensuring secure communication of a network entity with another network entity over a network entity configured to perform the steps according to a method described above, wherein the network entity comprises:
a network interface configured to access a first communication link of a first access technology and a second communication link of a second access technology for communication with another network,
a computing unit (e.g., a processor) configured to execute calculations of an algorithm implemented on the computing unit, wherein as a first option: the algorithm is configured to set up a uniform security level of the first and the second communication link based on the information about the type of trustiness or that as a second option: the algorithm is configured to set up a first security level of the first communication link and a second security level of the second communication link based on the information about the type of trustiness.

According to a fifth aspect, the invention relates to a computer program product (e.g., stored on a non-transitory computer-readable medium) running on a network entity and adapted to perform the method described above.

In the following, numerous features of the present invention are explained in detail via preferred embodiments. The present disclosure is not limited to the specifically discussed combinations of features. Rather, the features mentioned here can be combined arbitrarily into inventive embodiments, unless this is expressly excluded below.

Figure 4:
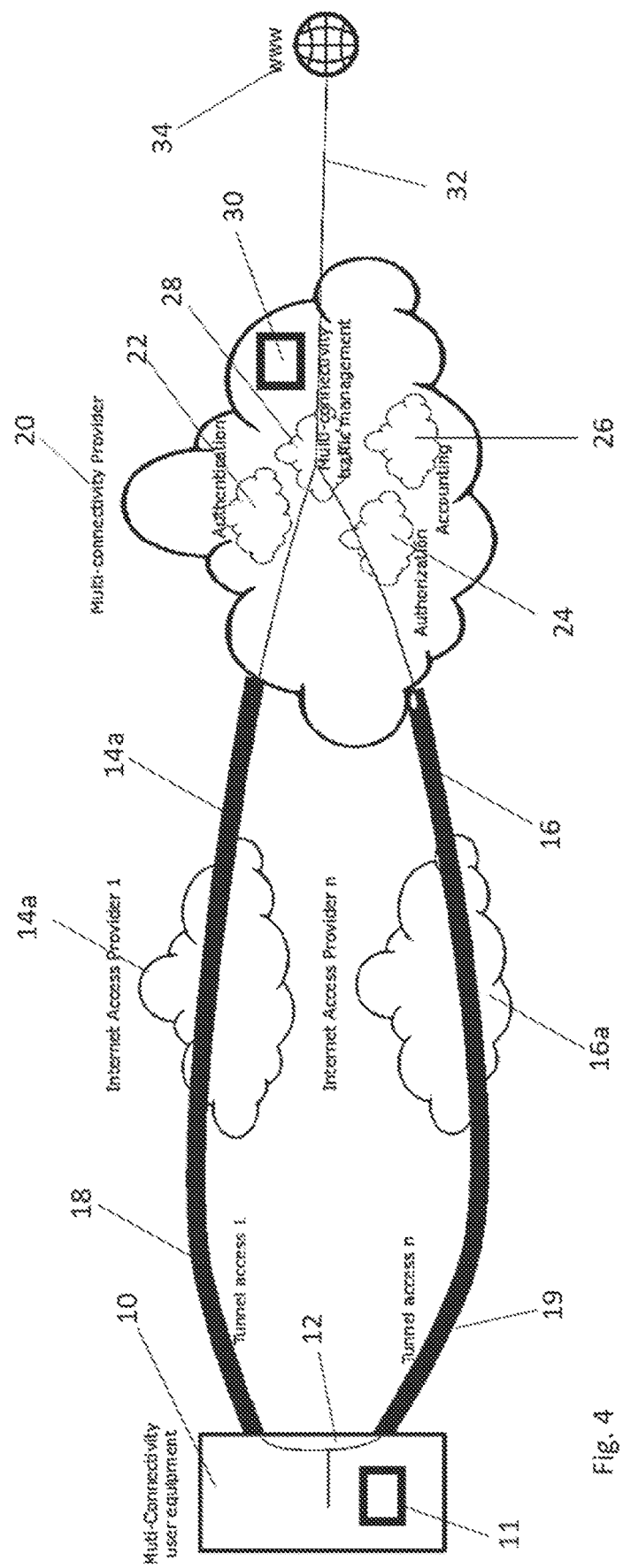
FIG. 4 shows a schematic architecture for an Over-the-top Multi-Connectivity provider according to the invention.

FIG. 4 shows a schematic architecture for an Over-the-top Multi-Connectivity provider according to the invention. The user equipment 10 has a computing unit 11 to execute codes implemented in an algorithm on the computing unit 11. The user equipment 10 has a network interface 12 configured to enable multi-connectivity of the UE 10 over different communication links 14, 16, in particular communication links 14, 16 with different communication standards in a hybrid communication scenario, like Wi-Fi, LTE, and/or 5G techniques. Each of the communication links 14, 16 can be provided by a different Internet access provider or by one single Internet access provider. In principle, the number of communication links 14, 16 is not limited. The communication links 14, 16 are implemented as tunneled communication links 18, 19. The tunneled communication links 18, 19 combine at a network entity that is closer to the core network. However, the communication links 18, 19 can also be implemented as encrypted tunneled communication links 18, 19, encrypted communication links 18, 19 or in any combination of those techniques. In FIG. 4 this network entity is realized via a multi-connectivity provider 20 that can provide authentication 22, authorization 24, accounting 26 and or multi-connectivity traffic management 28. All of these functionalities of the multi-connectivity provider 20 can be implemented on a server 30 that is associated with the multi-connectivity provider 20. A further communication 32 connects the multi-connectivity provider 20 to the Internet 34.

The invention provides technology to avoid or reduce the consuming of resources when applying terminal encryption in multi-access scenarios. As a general rule, encryption compared to non-encrypted tunnel/access leads to increased energy consumption, and the propagation of traffic is limited, too.

The technique of tunneling data traffic to redirect data through a traffic management remote point is important to ensure security and is therefore not put into question. However, depending on the on the type of trustiness, which basically means the level of trustiness, of the communication links, accesses, networks that need to be passed and/or security demand level of services/applications, different encryption levels can be applied to the tunnel. Furthermore, these encryption levels can be adjusted during communication which yields to a dynamically adjusted encryption level of the respective communication links.

An example is the application of an encryption algorithms, which are "weaker" encrypted compared to a properly secured tunnel but provide faster transmission and lower energy consumption. In other words, this is called an encryption having the lower encrypting level. Such a lower encrypting level can be applied if the data of the application is not that critical and/or if the communication link has a high level of trustiness. In the case of IPsec "NULL encryption" as defined in "R. Glenn and S. Kent, "The NULL Encryption Algorithm and Its Use With IPsec", RFC no. 2410, November 1998" it is an option to use a tunnel technology without encryption like IP-in-IP in "C. Perkins, "IP Encapsulation within IP", RFC no. 2003, October 1996".

Two exemplary solutions are provided to overcome the issue of a resource consuming encrypted tunnel in the traffic managed UE scenario by
1. an adaptive tunnel encryption level, which can be changed under operation or
2. multiple tunnels for multiple encryption levels.

Both solutions utilize input as to which trustiness level or levels are to be used, the input is given over to an algorithm implemented on the computing unit 11 and/or the server 30 as parameter. Based on these parameters, the algorithm calculates the adaptive tunnel encryption level. This input can be provided by the operator of the traffic management solution unit, the UE 10 itself, or by Service/Application requirements.

In addition, the second solution utilizes a switch implemented in the UE 10 and/or the server 30 to steer different type of data traffic, in particular individual data packets, with different security demand levels into the respective tunnel with the appropriate encryption level.

The first solution is considered to be the simpler one from an administration perspective but can only provide one uniform security level of the tunneled communication links 18, 19 at a time, which can be based on the highest security level demand. Basically, this uniform security level is set by the data packet that has the highest security demand level. Nevertheless, it is possible that the encryption security level is lowered if following data packets have lower security level demands The second solution can simultaneously provide different security encryption level of the tunneled communication links 18, 19 and hence offers finer resolution of security level demands and provides a better resource footprint. Resource consumption by tunnel encryption only takes place when the tunnel is used for transmission. An idle/unused encrypted tunnel does not require resources in this context. Therefore, the UE 10 might set up a first encrypted tunnel 18 with the highest possible encryption level and a second encrypted tunnel 19 with the lowest possible encryption level and decide before the transmission of each individual data packet to which of the two tunnels 18, 19 the data packet will be distributed via the switch, which is typically represented by a multipath scheduler. If the algorithm on the computing unit 11 decides that the data packet has a low security demand level, then this data packet can be scheduled to the second encrypted tunnel 19. This leads to minimal resource consumption while at the same time the first encrypted tunnel 18 is still established and can be used if it would be needed for following data packets.

In the following, different examples of technical implementation are described:

A. Trusted access:

A smartphone 10 connects to a Wi-Fi access, that can be represented for example by the communication link 14. The smartphone 10 receives the information that it can have trust in the communication link 14. This information about the type of trustiness can be given to the smartphone 10 by a network operator 20 or other trusted entities associated to the network. Especially if the operator of the excess and the traffic management operator are identical or share a relationship, they can valid give statements about the level of trustiness. It follows that for both the first and the second solution, the tunnel encryption can be switched off or set to the lowest encryption level.

B. Untrusted access and Banking Software:

A banking application is used on the smartphone 10 by the traffic management solution over an untrusted access. The banking application implements its own secure communication. The information about the security measures implemented by the banking software can be given as input to the algorithm so that it can decide how to adjust the tunnel encryption level.

Solution 1 to considers security demand levels other services/applications, too. In case only the banking application needs to be considered because it is the only application running on the smartphone 10, the tunnel encryption level can be lowered or switched off because the banking application has its own security measures.

Solution 2 steers the data packets of the banking software through a tunnel with lower or no encryption level and data packets of other applications, that have a higher security demand level on a tunnel with a higher encryption level.

C. Untrusted access and HTTP traffic:

HTTP traffic is unsecured by default. For untrusted traffic it makes sense to generally protect such a traffic environment.

Solution 1 set highest encryption level for the tunnel or for all of the multiple tunnels;

Solution 2 steers the HTTP traffic through the tunnel with the highest encryption level.

A great advantage is that the invention also considers "the type" of underlying access. In other words, the trustiness of the communication links 14,16. This results in an extra degree of freedom when determining which level of tunnel encryption is required.

If a UE 10 is connected simultaneously to a cellular and Wi-Fi access by the respective communication links 14, 16, whereas the cellular access is defined as a trusted access and the Wi-Fi as an untrusted access. Giving these parameters as input to the algorithm, this could result in a decision to establish no tunnel encryption over the cellular communication link and establish two tunneled communication links over Wi-Fi access, whereas one of the Wi-Fi communication links is being operated with and the other without tunneled encryption. A dedicated logic is utilized within the UE 10 and/or the server 30 to run such tunneled communication links 18, 19. In solution 2, the packet switch, e.g. the multipath scheduler, implemented in the UE 10 and/or the server 30 can decide to send already secured traffic through the trusted cellular communication link without additional encryption because it is considered to be secure. As another option, the packets which can decide to use an encrypted tunnel over the Wi-Fi communication links.

Preferably, the multipath scheduler, e.g. a MPTCP scheduler or MPDCCP scheduler, has knowledge about the individual access trustiness level of the communication links and/or the security demand levels of the data packets. The security demand level of the data packets can be provided by DPI, protocol information, Destination etc. depending on cost metrics (monetary, energy, . . . ).

The invention results in cellular usage, which does not require additional computation overhead leading to higher energy consumption and lower propagation speed. However, when monetary costs outweigh, the encrypted Wi-Fi tunnel might be preferred.

The same scenario could also lead to the situation that no encrypted tunnel over the Wi-Fi will be established, since it is known that the cellular access can securely take care on unprotected data.

Another scenario considers both accesses as untrusted which leads to the establishment of an encrypted tunnel and an unencrypted tunnel per access. The packet switch of solution 2 can select between four logical links, whereas two are encrypted and two non-encrypted.

In case both accesses are trusted, no encrypted tunnel is needed at all.

Figure 5:
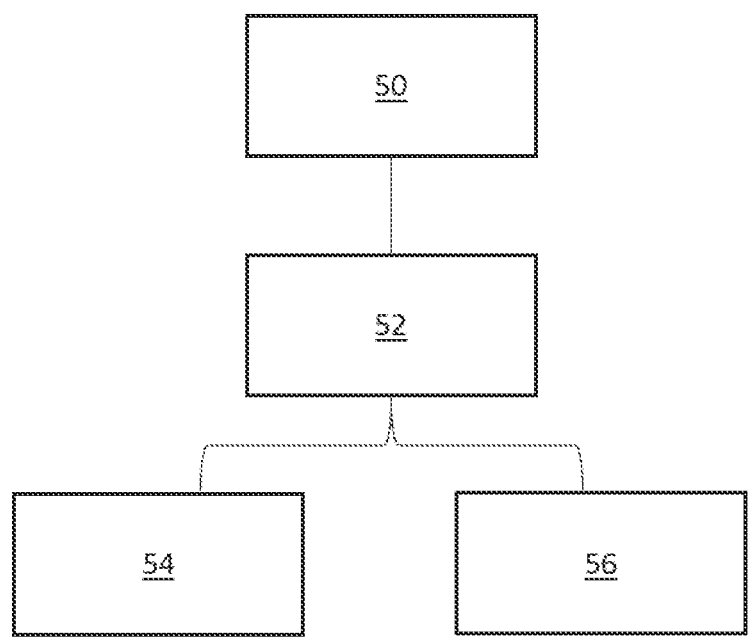
FIG. 5 shows a process implemented on a network entity.

FIG. 5 shows a process implemented on a network entity, e.g. the smartphone 10 or the server 30:

Step 50: Retrieving information about a type of trustiness of the first communication link of the first access technology and about a type of trustiness of the second communication link of the second access technology.

Step 52: Providing the information about the type of trustiness as a first input parameter to an algorithm implemented on a computing unit of the UE and/or the server, wherein the algorithm is configured to calculate encryption security levels: Receiving and/or accessing information about a type of trustiness of the Wi-Fi Hotspot.

As a first option:

Step 54: Setting up a uniform encryption security level of the first tunneled communication link and the second tunneled communication link based on the information about the type of trustiness;

or as a second option:

Step 56: Setting up a first encryption security level of the first tunneled communication link and a second first encryption security level of the second tunneled communication link based on the information about the type of trustiness.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing secure wireless communication of a first device in a communication system, wherein the method comprises:
retrieving information about a type of trustiness of a first communication link of a first access technology and about a type of trustiness of a second communication link of a second access technology, wherein a second device and the first device are configured to communicate data with each other via the first communication link and the second communication link; and
setting up, by a processor of the first device and/or a processor of the second device, security level(s) for the first and second communication links based on the information about the type of trustiness of the first communication link and about the type of trustiness of the second communication link, wherein setting up the security level(s) comprises:
setting up a uniform dynamic security level for both the first and second communication links based on the information about the type of trustiness of the first communication link and about the type of trustiness of the second communication link, wherein the dynamic security level is adjustable during communication over the first and second communication links; or
setting up a first security level for the first communication link and a second security level for the second communication link based on the information about the type of trustiness of the first communication link and about the type of trustiness of the second communication link, wherein the first security level is different from the second security level.

2. The method of claim 1, further comprising:
analyzing the data before transmission and determining a security demand level of the data.

3. The method of claim 2, wherein the data is analyzed with respect to deep packet inspection (DPI), protocol information and/or destination of data packets.

4. The method of claim 2, wherein different data packets of the data have different security demand levels.

5. The method of claim 2, wherein setting up the security level(s) is further based on the security demand level of the data.

6. The method of claim 2, further comprising:
receiving, by a multipath scheduler, information about the security demand level of the data.

7. The method of claim 6, further comprising:
scheduling, by the multipath scheduler, data packets of the data to the first communication link and the second communication link based on respective security demand levels of the data packets.

8. The method of claim 1, further comprising:
receiving, by a multipath scheduler, information about type of trustiness of the data.

9. The method of claim 8, further comprising:
scheduling, by the multipath scheduler, data packets of the data to the first communication link or the second communication link based on the type of trustiness of the data.

10. The method of claim 1, wherein the information about the type of trustiness of the first communication link and about the type of trustiness of the second communication link is stored in a network entity, gained from user feedback, gained from Wi-Fi specifications, and/or gained from location information.

11. The method of claim 1, wherein the first communication link and/or the second communication link is a tunneled communication link.

12. The method of claim 1, wherein the first device is a user equipment (UE), and the second device is a server of a network provider.

13. The method of claim 1, wherein the first device is a user equipment (UE) or a server of a network provider.

14. The method of claim 1, further comprising:
scheduling, by a multipath scheduler, data packets of the data to the first communication link or the second communication link.

15. The method of claim 1, wherein the level of trustiness of the first communication link is higher than the level of trustiness of the second communication link; and
wherein based on the level of trustiness of the first communication link being higher than the level of trustiness of the second communication link, the first communication link is set up with a lower security level than the second communication link.

16. The method of claim 15, wherein the first communication link corresponds to a home-based Wi-Fi connection, and the second communication link corresponds to a foreign Wi-Fi connection.

17. A communication system for providing secure wireless communication of a user equipment (UE), wherein the communication system comprises:
a user equipment;
a server of a network provider; and
a network configured to provide a first communication link of a first access technology and a second communication link of a second access technology for communication of data between the UE and the server;
wherein a processor of the user equipment and/or a processor of the server is configured to:
retrieve information about a type of trustiness of the first communication link and about a type of trustiness of the second communication link; and
setting up security level(s) for the first and second communication links based on the information about the type of trustiness of the first communication link and about the type of trustiness of the second communication link, wherein setting up the security level(s) comprises:
setting up a uniform dynamic security level for the first communication link and the second communication link based on the information about the type of trustiness of the first communication link and about the type of trustiness of the second communication link, wherein the dynamic security level is adjustable during communication over the first and second communication links; or
setting up a first security level for the first communication link and a second security level for the second communication link based on the information about the type of trustiness of the first communication link and about the type of trustiness of the second communication link, wherein the first security level is different from the second security level.

18. The communication system of claim 17, wherein the UE and/or the server comprises a multipath scheduler configured to distribute data packets of the data between the first and the second communication link.

19. A non-transitory computer-readable medium having processor-executable instructions stored thereon for providing secure wireless communication of a first device in a communication system, wherein the processor-executable instructions, when executed, facilitate:

retrieving information about a type of trustiness of a first communication link of a first access technology and about a type of trustiness of a second communication link of a second access technology, wherein a second device and the first device are configured to communicate data with each other via the first communication link and the second communication link; and setting up, by a processor of the first device and/or a processor of the second device, security level(s) for the first and second communication links based on the information about the type of trustiness of the first communication link and about the type of trustiness of the second communication link, wherein setting up the security level(s) comprises:

setting up a uniform dynamic security level for the first communication link and the second communication link based on the information about the type of trustiness of the first communication link and about the type of trustiness of the second communication link, wherein the dynamic security level is adjustable during communication over the first and second communication links; or setting up a first security level for the first communication link and a second security level for the second communication link based on the information about the type of trustiness of the first communication link and about the type of trustiness of the second communication link, wherein the first security level is different from the second security level.

* * * * *